United States Patent [19]

Fujii et al.

[11] 4,291,140

[45] Sep. 22, 1981

[54] NOVEL PROPYLENE COPOLYMERS

[75] Inventors: Masaki Fujii; Mitsutaka Miyabayashi, both of Yokkaichi; Hironori Todaka, Suzuka; Satoru Hattori, Yokkaichi, all of Japan

[73] Assignee: Mitsubishi Petrochemical Co., Ltd., Japan

[21] Appl. No.: 198,921

[22] Filed: Oct. 20, 1980

[30] Foreign Application Priority Data

Oct. 24, 1979 [JP] Japan ................................ 54-137171

[51] Int. Cl.$^3$ .......................................... C08F 297/08
[52] U.S. Cl. .................................... 525/321; 428/336; 428/339; 428/412; 428/483; 428/516; 428/476.1; 525/247; 526/348.1; 526/348.2
[58] Field of Search .............................. 525/321, 247

[56] References Cited

U.S. PATENT DOCUMENTS 3,530,107  9/1970  Yoshiora et al. .................. 525/321

Primary Examiner—Stanford M. Levin
Attorney, Agent, or Firm—Robert E. Burns; Emmanuel J. Lobato; Bruce L. Adams

[57] ABSTRACT

A new propylene copolymer comprises a propylene homopolymer block and a terpolymeric random copolymer block of propylene, ethylene, and hexene-1 and is further characterized in that: (a) the proportion therein of the propylene homopolymer block is 97 to 80 percent by weight; (b) the terpolymeric random copolymer block has been so copolymerized that the contents therein of the propylene, ethylene, and hexene-1 based on their respective monomers are 80 to 98 percent, 5 to 1 percent, and 15 to 1 percent, respectively, all percentages being by weight; and (c) the intrinsic viscosity thereof in a decalin solution at 135° C. is 0.3 to 15 dl/g.

5 Claims, 2 Drawing Figures

NOVEL PROPYLENE COPOLYMERS

BACKGROUND OF THE INVENTION

1. Field of the art

This invention relates to novel propylene-based copolymers which are highly suitable for forming films having excellent heat-sealing characteristics, transparency or luminous transmittance, and blocking resistance.

Films made of polypropylenes have excellent mechanical, optical, or thermal characteristics and, for this reason, are being widely used as materials for packaging of commodities such as foodstuffs and textile products. For imparting to the polypropylene films the forms of containers such as bags in this case, or for tightly sealing these containers after placing of the commodities therein, the heat-sealing characteristics (good or poor) have a great influence on the packaging speed, rate of incidence of articles with incomplete seals, deterioration of the packaged commodity due to the sealing heat, and other results.

Therefore, there is an extremely urgent demand for improvement of the heat-sealing characteristics of polypropylene films in cases where these films are to be used as single-layer films and also in cases where they are to be used as composite films each having on its surface an easily heat-sealable layer. Furthermore, it is known that the heat-sealing characteristics of a film are closely related to the melting/crystallizing characteristics of the resin from which that film has been made, and that the lower the melting temperature or the crystallizing temperature, the lower is the heat-sealing temperature at which a specific seal strength can be obtained.

On the one hand, among the various characteristics required of a packaging film, blocking resistance, for example, ordinarily has the tendency of deteriorating with an improvement in the heat-sealing properties, and the question of how the heat-sealing characteristic can be improved without impairing the blocking resistance becomes a crux of the problem of advancing the art.

A further consideration is that it is necessary for a film to be amply transparent for its use as a packaging film, and an improvement in the heat-sealing properties which entails a sacrificing of transparency or luminous transmittance is of low value.

2. Prior art

As polypropylene-based resins for readily heat-sealing films, numerous crystalline random copolymers of propylene and ethylene have been proposed in the prior art.

For example, in Japanese Patent Publication Nos. 31478/1971 and 14343/1974, examples of copolymers of propylene and ethylene containing at least 75 percent by weight of propylene and crystalline random copolymers of propylene and ethylene containing 1 to 6 percent by weight of ethylene are set forth. However, the heat-sealing temperatures of these copolymers to be applied in order to obtain heat-sealing strengths necessary for practical use could not be said to have been amply lowered.

Furthermore, as the ethylene content is increased, the heat-sealing properties are undoubtedly improved, albeit to a small extent, but the blocking resistance rapidly deteriorates, whereby a polymer of this nature is not suited for practical use. Moreover, the transparency also deteriorates. Further problems arise in the production of these resins. The properties of a copolymer having such a high ethylene content in the polymerization reactor such as for example the particle shapes deteriorate, or the viscosity of the polymer slurry is excessively high, whereby it is difficult to operate the polymerization reactor in a stable manner. As an ultimate result, industrial production becomes impossible.

In Japanese Patent Publication No. 30434/1977, it is stated that a copolymer of propylene and an $\alpha$-olefin having 4 to 10 carbon atoms which has a propylene content based on the copolymer of 80 to 95 percent by weight, particularly a copolymer in which butene-1 has been used for the $\alpha$-olefin, is optimal as a readily heat sealable layer. As a result of our own tests, also, in a high-content region above 10 percent by weight of the butene-1 content in a copolymer of propylene and butene-1, the heat-sealing properties are certainly improved. Nevertheless, the heat-sealing temperature for obtaining a seal strength of 500 g per 20-mm width by our method as described hereinafter, is of the order of 130° to 135° C., and the transparency or luminous transmittance also appears to be the same as or somewhat inferior to that of a propylene-ethylene copolymer.

In Japanese Patent Laid-Open Publication No. 11281/1977, it is stated that good results can be obtained by using as an easily heat sealable layer a crystalline random copolymer having a composition of 86 to 98.9 percent by weight of propylene, 1 to 10 percent by weight of a straight-chain $\alpha$-olefin other than propylene, and 0.1 to 4.0 percent by weight of ethylene. However, according to the results of the examples given therein and our own tests, this prior invention appears to provide a film of a heat-sealing temperature of the order of 130° C. As a result of our supplementary tests, we have confirmed that, as the ethylene and $\alpha$-olefin contents are increased within the ranges set forth in the above publication in order to lower the lower-limit temperature of the sealable temperature, there occurs a serious deterioration of the properties of the copolymer particles, and stable operation of the polymerization reactor becomes impossible. In addition, the product film undergoes severe blocking.

SUMMARY OF THE INVENTION

It is an object of this invention to provide solutions to the above described problems encountered in the prior art and to provide new propylene copolymers suitable for use in the form of films having simultaneously excellent heat-sealing properties, transparency or luminous transmittance, and blocking resistance. This object and other objects of the invention have been achieved by carrying out copolymerization by a specific restricted mode.

According to this invention there are provided propylene copolymers each of which, differing from known random copolymers, is a ternary copolymer containing a propylene homopolymer block. The propylene copolymer of this invention is obtainable by homopolymerizing propylene, and then charging ethylene, propylene, and hexene-1 thereto to carry out random copolymerization of the same.

The propylene copolymer of this invention is characterized in that: (a) the proportion therein of the propylene homopolymer block is 3 to 20 percent by weight; (b) the proportion therein of the ternary random copolymer block is 97 to 80 percent by weight; (c) the ternary random copolymer block comprises the contents based on the propylene, ethylene, and hexene-1 of 80 to 98 percent, 5 to 1 percent, and 15 to 1 percent, respectively, all percentages being by weight; and (d) the intrinsic viscosity thereof in decalin at 135° C. is 0.3 to 15 dl/g.

The nature, utility, and further features of this invention will be more apparent from the following detailed description beginning with a consideration of general aspects of the invention and concluding with specific examples of practice thereof, application examples, and comparison application examples.

Throughout the following description, quantities, including concentrations, expressed in percent and parts are by weight unless specified otherwise.

DETAILED DESCRIPTION OF THE INVENTION

1. Copolymer

Figure 1:
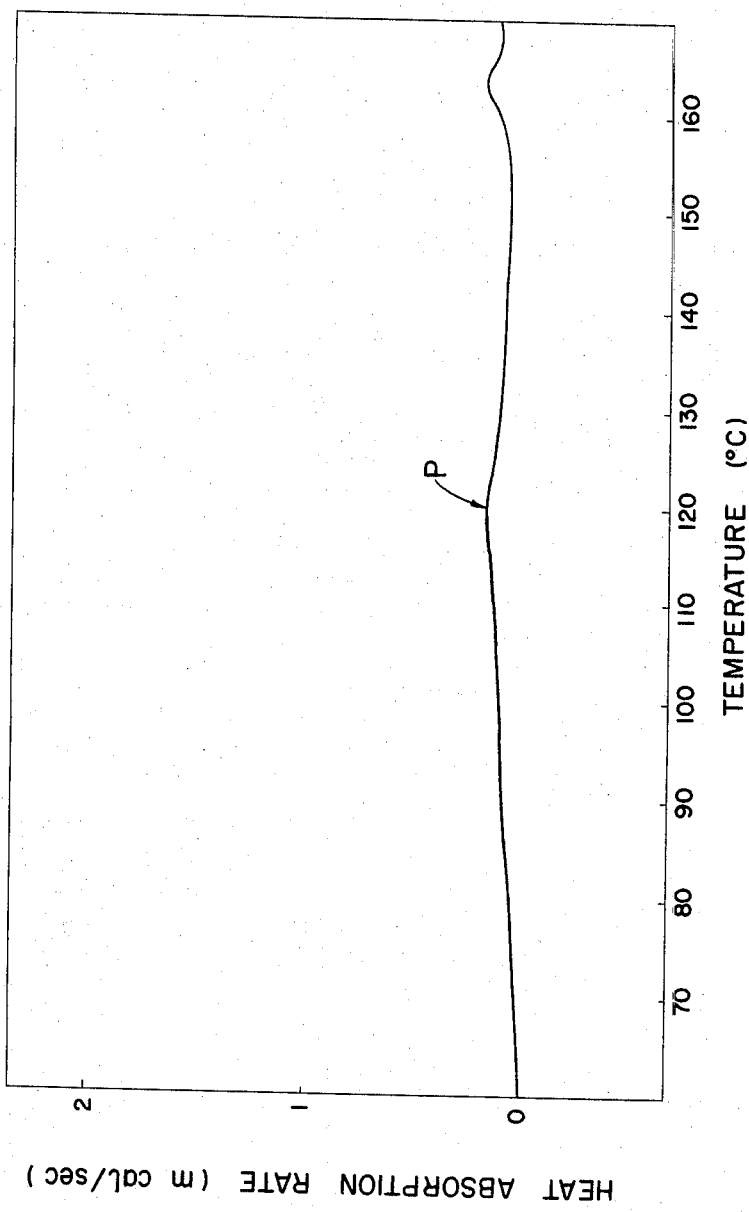
FIG. 1 is a graph indicating the result of a differential scanning calorimetry (DSC) of a copolymer obtained in Example 1 set forth hereinafter of this invention, in which reference character p denotes the melting peak temperature.

The copolymer of this invention is constituted from two kinds of polymer elements. One of these elements is a homopolymer block (a) of propylene, while the other is a random copolymer block (b) of propylene, ethylene and hexene-1.

The copolymer is defined as hereinabove, and preferably satisfies the following conditions (i) and (ii).

(i) The proportion of the propylene homopolymer block (a) in the copolymer is 3 to 15 percent.

(ii) The contents based on the olefin monomers of propylene, ethylene, and hexene 1 in the ternary random copolymer block (b) are respectively 85 to 96 percent, 4 to 2 percent, and 11 to 2 percent.

Further, a preferable condition is that wherein the above mentioned ternary random copolymer block (b) has an ethylene content and a hexene-1 content within the region enclosed by the group of straight lines represented by the relationships (1), (2), and (3) given below in an X-Y coordinate plane in which the X axis represents the hexene-1 content (percent), and the Y axis represents the ethylene content (percent).

$$2 \leq X \leq 11 \quad (1)$$

$$2 \leq Y \leq 4 \quad (2)$$

$$(-\tfrac{1}{4}X+3.5) \leq Y \leq (-\tfrac{1}{4}X+6) \quad (3)$$

A copolymer of this invention has at least one or, depending on the case, two or more melting peaks indicated by differential scanning calorimetry, of which at least one is within a temperature range of 115° to 130° C., preferably 120° to 128° C., has a density of 0.880 to 0.895 g/cc, and has the following absorption peaks in an infrared absorption spectrum.

Absorption of propylene homopolymer block (a): vicinity of 1,167 cm$^{-1}$

Absorption based on propylene in the ternary copolymer block (b): 1,167 cm$^{-1}$ Absorption based on ethylene in the ternary copolymer block (b): vicinity of 735 cm$^{-1}$ Absorption based on hexene-1 in the ternary copolymer block (b): vicinity of 729 cm$^{-1}$ Films produced from the novel copolymers of this invention are heat-sealable at a temperature at or below 120° C., especially in the vicinity of 100° C., and have excellent transparency and blocking resistance.

We have found that, in each of these copolymers, a decrease in the content of the hexene-1 and a decrease in the ethylene content have the effect of reducing the transparency and, at the same time, of raising the heat-sealing temperature. Conversely, an increase in the hexene-1 content and an increase in the ethylene content have the effect of lowering the blocking resistance. Therefore, it is important to select the contents of all olefins constituting the ternary random copolymer block (b) at values within their respective ranges according to this invention with due consideration of the various properties of the desired film.

We have found further that, in the case where the proportion of the propylene homopolymer block (a) in the copolymer is 3 to 20 percent, it has the effect of improving the blocking resistance without loss of low-temperature heat-sealability and transparency of the film.

Furthermore, in the case of a lower molecular weight copolymer whose intrinsic viscosity is less than 0.3 dl/g in decalin at 135° C., extrusion forming is difficult, and, at the same time, the film strength is low. On the other hand, when the intrinsic viscosity exceeds 15 dl/g, the melt fluidity is poor, and forming becomes difficult.

2. Production of the copolymer

The copolymer of this invention is produced by using a catalyst in a group of catalysts generally known as Ziegler type composite catalysts. The copolymer is produced with high efficiency particularly with the use of a catalyst comprising as principal components a titanium-based compound such as titanium trichloride, titanium tetrachloride, and a titanium compound supported on magnesium chloride, or the like, and an organoaluminum compound.

A particularly preferable catalyst comprises (a) a solid obtained by reducing TiCl$_4$ with an organoaluminum compound or metallic aluminum and further treating the product with a complexing agent for aluminum and (b) an organoaluminum compound, the organoaluminum compound in each instance being represented by the formula AlR$_n$X$_{3-n}$, wherein: R is a hydrocarbon residue having 1 to 18 carbon atoms; X is a halogen; and n is a number defined by $0 < n \leq 3$.

Products obtained by reducing TiCl$_4$ with organoaluminum compounds or metallic aluminum are known and are available on the market. Furthermore, complexing agents suitable for use in this case are mono- or diethers, thioethers, thiols, phosphines, stibines, arsines, amines, amides, ketones, and esters, each having a total number of carbon atoms of the order of 4 to 16. Of these, monoethers of a total number of carbon atoms of the order of 8 to 12, such as butylether, isoamylether, and octylether are especially suitable. The treatment with the complexing agent can be carried out by contacting the titanium trichloride composition with the complexing agent, in an inactive liquid medium according to necessity, at a temperature of the order of 0° to 80° C. for 5 minutes or more, preferably with agitation, and appropriately washing with an inactive liquid medium.

Thereafter, the composition thus treated is heat treated in an inactive atmosphere at a temperature of the order of 80° to 200° C. for a time of the order of 30 minutes to 5 hours or is contacted with TiCl$_4$ or a solution thereof in a hydrocarbon, at a temperature of −30° to +100° C., preferably 40° to 80° C., for 30 minutes to 4 hours, preferably 1 to 3 hours and is thereafter filtered, washed and dried, if necessary, and activated for use.

Since the specific surface area of a solid component of this character is large, its activity with respect to the olefin copolymerization is naturally high, but an unexpected discovery we have made is that, in the production of the copolymer of this invention comprising propylene, hexene-1, and ethylene, the following advantageous effects are obtained:

(1) Even when the contents of the hexene-1 and the ethylene in the copolymer are increased, the production of the by-product polymers that are readily soluble in hexane, heptane, and like lower hydrocarbon solvents which are most undesirable as the principal cause of blocking of the film can be held at a low level. In other words, copolymers of high hexene-1 content and high ethylene content which were heretofore thought to be unattainable can be realized to exhibit hitherto unknown high performances.

(2) For the same hexene-1 and ethylene contents, copolymers of improved transparency, heat-sealing properties, and blocking resistance in comparison with those of copolymers produced with other catalysts can be obtained.

Specific examples of the organoaluminum compound to be used in combination with a special titanium trichloride of this character are triethylaluminum, tri-i-butylaluminum, tri-n-octylaluminum, diethylaluminum hydride, diethylaluminum chloride, diethylaluminum iodide, ethylaluminum sesquichloride, and ethylaluminum dichloride. Of these, dialkylaluminum halides in which the alkyl contains 1 to 4, preferably 2, carbon atoms and the halide is chloride or iodide such as diethylaluminum chloride and diethylaluminum iodide are preferred.

While this catalyst system must contain these titanium trichloride and organoaluminum compound as indispensible components, any of various electron donative compounds can be added as a third component thereto. In this case, the proportion of ingredients soluble in heptane or hexane in the product copolymer can be decreased, and for this reason improvement in the blocking resistance of the film or an improvement in the unit consumption of the monomers with respect to the product copolymer can be expected.

Typical examples of such electron donative compounds are organic esters, preferably alkyl methacrylates and alkyl benzoate in which the alkyl contains 1 to 4 carbon atoms, such as methyl methacrylate and ethyl benzoate, ethers, preferably those monoethers having the total carbon atoms of 2 to 8 such as diisoamylether, diethylether, and ethylene glycol dimethylether, and amines, preferably N-alkyl mono- or diamines, such as trimethylamine, N,N,N',N'-tetramethylethylenediamine. Of these, ethers and organic esters are highly effective.

The copolymerization is carried out in two process stages. Of these two stages, the first stage is that of propylene homopolymerization, and the succeeding stage is that of random copolymerization of propylene, hexene-1, and ethylene. This sequence of stages may be reversed, the copolymerization stage being carried out first and the homopolymerization stage being carried out thereafter. In this case, however, a measure may be necessary for substantially preventing a monomer other than propylene from existing in the latter stage of homopolymerization of propylene.

The homopolymerization of propylene, which is ordinarily the first stage, is ordinarily carried out at a relatively low temperature of the order of 0° to 60° C., preferably 5° to 55° C., and more preferably 10° to 50° C. The random copolymerization of the succeeding stage is ordinarily carried out at a temperature within the range of 30° to 100° C., preferably 40° to 85° C., and more preferably 50° to 70° C. In each of the polymerization stages, the temperature need not be constant. Furthermore, in the random copolymerization stage, the mutual ratios of the three monomers need not be constant.

The most desirable method of producing the copolymers of this invention is set forth in detail in the specification of Japanese Patent Application No. 85593/1979.

3. Uses

As stated hereinbefore, the copolymers of this invention are most suitable for use as packaging film of commodities such as foodstuffs and vegetables. These copolymers can be utilized in the form of single-layer film or in the form of composite film with a film of another resin such as, for example, a propylene homopolymer film.

The films can be formed by the casting method, the inflation method, the calendering method, or other suitable methods.

While a film may be in stretched or drawn state, a film made of a copolymer of this invention which is substantially not molecularly oriented is preferred. If the film is molecularly orientated, contraction occurs at the sealed parts at the time of heat sealing to impair the external appearance of the film.

Accordingly, when a film is required to have strength, a composite film of a construction wherein, on at least one surface of a substrate film having an orientation due to being stretched in at least one axial direction, a film of the instant copolymer for imparting low-temperature heat-sealability which is substantially not molecularly orientated is caused to adhere is preferable over a single-layer film.

Such a composite stretched film is produced by extruding together a copolymer of this invention and another resin to form a laminated film and stretching this laminated film at a stretching temperature which is equal to or higher than the melting point of the copolymer yet is lower than the melting point of the other resin.

Alternatively, the composite stretched film can be produced by stretching beforehand a film of the other resin in a first direction, laminating on this film a film of the copolymer of this invention, and then stretching the laminated film thus formed in the direction transverse to the first direction at a stretching temperature which is equal to or higher than the melting point of the copolymer but is lower than the melting point of the other resin.

Still another method of producing the composite drawn film comprises laminating a film of the copolymer of this invention on a film of the other resin which has been biaxially orientated.

For this other resin, a thermoplastic resin of a melting point at or above 145° C. is preferred. Examples of such resins other than the aforementioned propylene homopolymers are copolymers of propylene and other α-olefins, polyamides, polycarbonates, and polyethyleneterephthalates.

The film thickness of a single-layer film is 10 to 260μ, preferably 15 to 60μ. In a composite film, the thickness of the outer surface layer of the copolymer of this invention is 0.2 to 60μ, preferably 0.5 to 20μ, while that of the substrate layer of the other resin is 15 to 250μ, preferably 20 to 100μ, the total film thickness being 16 to 260μ, preferably 21 to 60μ.

Furthermore, the degree of stretching in one direction is at least 2.3 times, preferably 4 to 16 times, the original length of the film.

In order to indicate more fully the nature and utility of this invention, the following specific examples of practice thereof, application examples, and comparison application examples are set forth, it being understood that these examples are presented as illustrative only and are not intended to limit the scope of the invention.

EXAMPLE 1

The interior of a polymerization reactor of a capacity of 150 liters provided with an agitator was thoroughly purged with propylene, and then 15 liters of n-heptane, 3.9 g of titanium trichloride (TAU catalyst manufactured by Marubeni Solvay Kagaku K.K., Japan), and 19.5 g of diethylaluminum chloride (DEAC) were introduced into the reactor. The reaction temperature was set at 40° C., and propylene was fed into the reactor at a rate of 4.3 kg/hour for 30 minutes (thus, the propylene homopolymer block was prepared.)

The temperature was then raised to 60° C., and propylene, hexene-1, and ethylene were fed at rates of 3.5 kg/hour, 1.7 kg/hour, and 0.13 kg/hour, respectively, for 5 hours. During this step, hydrogen was also supplied to maintain the hydrogen concentration in the gaseous region at 5.5 percent. Thus, the propylene/hexene-1/ethylene terpolymeric random copolymer block was prepared.

Upon completion of the copolymerization, the residual gas was withdrawn, and the other contents of the polymerization reactor were transferred to a separate vessel. The interior of the polymerization reactor was washed by placing thereinto 45 liters (lit.) of n-heptane, 1.2 lit. of n-butanol and 9 g of potassium hydroxide and agitating these liquids at 65° C. for 2 hours (catalyst removal and neutralization). By centrifugal separation, the copolymer was obtained as a cake containing the solvent. This cake was further treated at 100° C. together with 65 lit. of pure water containing 8 g of a nonionic emulsifier, and the solvent was removed by steam stripping. Thereafter, the purified copolymer was obtained by centrifugal separation and drying under reduced pressure.

The copolymer thus obtained was found to have a density of 0.8850 g/cc and an intrinsic viscosity, as measured in decalin at 135° C., of 2.4 dl/g.

Furthermore, while the proportion of the propylene homopolymer block in the copolymer was 17.2 percent, it is difficult to calculate this proportion from only the results of analysis of the final copolymer. Accordingly, this proportion was indirectly calculated by carrying out the process under the same conditions as in the above described example up to and including the propylene homopolymerization stage, decomposing the catalyst immediately thereafter, obtaining a polymer by separating by filtration and drying under the same conditions as in the above described example, measuring the weight of this polymer, and assuming that a propylene hompolymer of the same weight as this is formed also in the above described example.

In addition, the composition of the copolymer of this invention was determined by using a C13-NMR to calculate the contents in the random copolymer block based on the olefins, whereupon the composition was found to be 88.4 percent of propylene, 3.6 percent of ethylene, and 8.0 percent of hexene-1.

The melting peak temperature determined by differential scanning calorimetry (FIG. 1) of this copolymer was found to be 120° C.

EXAMPLE 2

By the procedure set forth in Example 1 except for a feed rate of the propylene in the preparation of the propylene homopolymer block of 1.25 kg/hour and feed rates of the hexene-1 and ethylene in the preparation of the terpolymeric copolymer block of 1.85 kg/hour and 0.10 kg/hour, respectively, a copolymer having the following properties was obtained.

Figure 2:
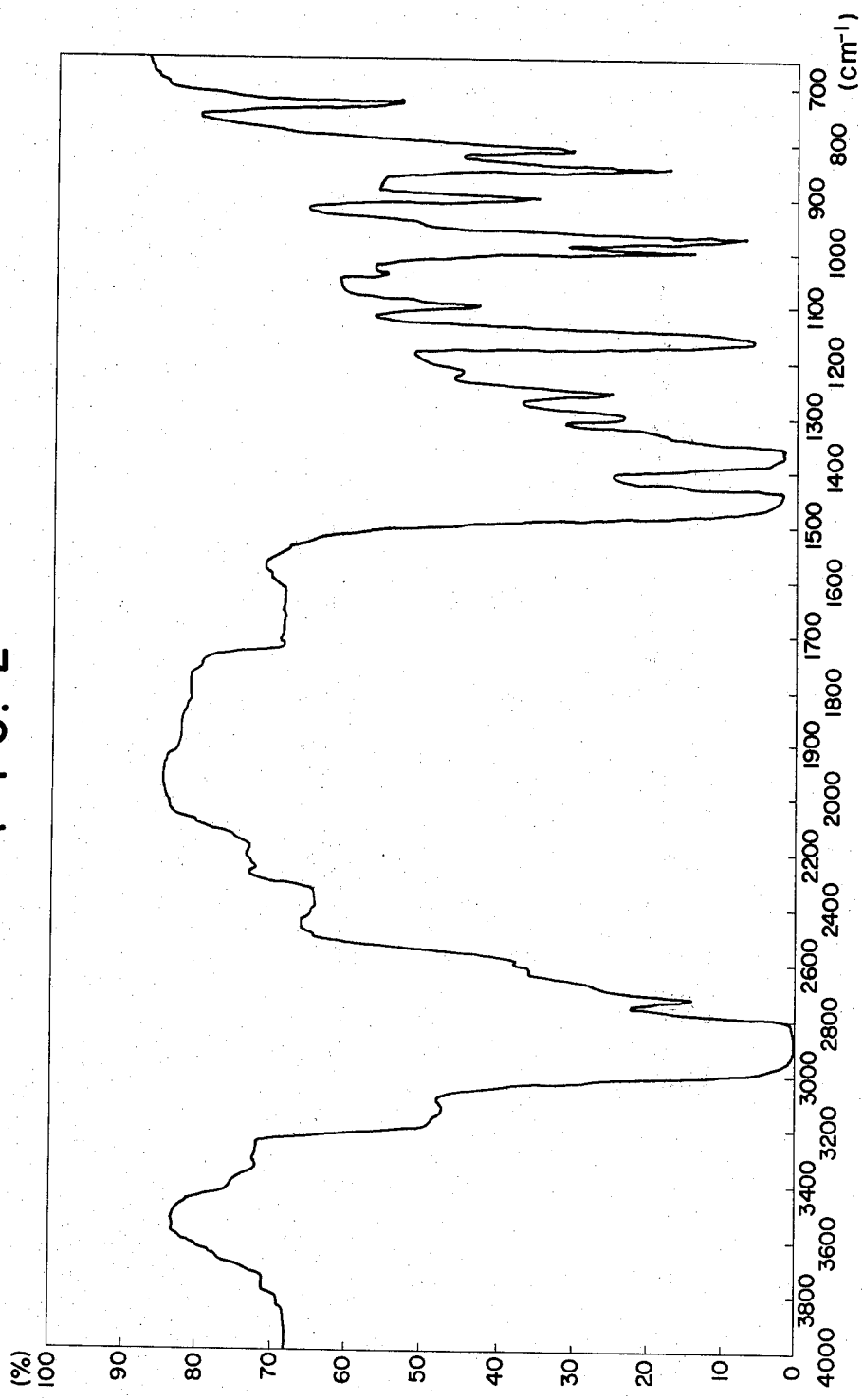
FIG. 2 is an infrared absorption spectrum of a copolymer obtained in Example 2 also set forth hereinafter.

The infrared-ray absorption spectrum of this copolymer is shown in FIG. 2.
Density: 0.8824 g/cc
Intrinsic viscosity: 2.9 dl/g
Proportion of propylene homopolymer block: 5.6%
Olefin contents in random copolymer block
  Propylene: 87.3%
  ethylene: 2.2%
  hexene-1: 10.5%
Melting peak of DSC: 127° C.

EXAMPLE 3

By the procedure of Example 1 except for a feed rate of the propylene in the preparation of the propylene homopolymer block of 3.0 kg/hour and feed rates of the hexene-1 and the ethylene in the preparation of the ternary random copolymer block of 0.80 kg/hour and 0.20 kg/hour, respectively, a propylene copolymer having the following properties was obtained.
Denisty: 0.8827 g/cc
Intrinsic viscosity: 2.6 dl/g
Proportion of propylene homopolymer block: 12.5%
Olefin contents in random copolymer block
  propylene: 93.7%
  ethylene: 3.8%
  hexene-1: 2.5%
Melting peak of DSC: 120° C.

EXAMPLE 4

The procedure of Example 1 was carried out under the conditions set forth therein except for a feed rate of the propylene in the preparation of the propylene homopolymer block of 1.0 kg/hour and feed rates of the hexene-1 and the ethylene in the preparation of the ternary random copolymer block of 1.40 kg/hour and 0.10 kg/hour, respectively, whereupon a propylene copolymer having the following properties was obtained.
Density: 0.8894 g/cc
Intrinsic viscosity: 2.5 dl/g
Proportion of propylene homopolymer block: 4.2%
Olefin contents in random copolymer block
  propylene: 91.6%
  ethylene: 2.4%
  hexene-1: 6.0%
Melting peak of DSC: 120° C.

APPLICATION EXAMPLES 1 THROUGH 4

With 100 parts of each of the copolymers obtained according to Examples 1 through 4, 0.1 part of 2,6-ditertiary butyl-4-methylphenol (antioxidant), 0.15 part of silica powder (antiblocking agent), 0.06 part of erucamide (slip agent) were blended to form respective compositions. Each of these compositions was melt-kneaded and extruded into a strand at 240° C. by means of an extruder of 50-mm screw diameter and cooled with water. Each strand was then cut to produce pellets of 2 to 3 mm in diameter.

By means of an Egan Tee-die extrusion forming machine of 65-mm screw diameter, the pellets of each kind were extruded at 220° C. through the die into a film, which, as it was taken off at a take-off speed of 16 meters/second, was cooled by a roll, whereupon a single-layer film of 30-μ thickness was obtained.

The product quality of each film thus obtained was evaluated in the following manner. The results are set forth in Table 1.

Heat-Sealing Temperature

Two sheets of each sample film were clamped between two sheets of Teflon film of 0.1-mm thickness, and the films thus assembled were placed between the heating plates of a Model II heat sealer manufactured by Tōyō Seiki, Japan. Under a pressure of 1 kg/cm$^2$, the sample sheets were heat sealed during a sealing time of 1 second at a specific heating-plate temperature, the width of the sealed part being 20 mm.

The sample film thus heat sealed was cut into test pieces each of 2-cm width and 10-cm length. Similarly, test pieces were prepared from sample film heat sealed at other heat-plate temperatures.

The 180-degree peeling strength of each of these test pieces was measured at a pulling speed of 500 mm/second by means of a Schopper type tensile testing machine manufactured by Tōyō Seiki, Japan.

The temperature of the heating plates required to fabricating a test piece exhibiting a peeling strength of 500 g/2 cm of width was denoted as the heat-sealing temperature.

Haze (luminous transmittance)

Tests were carried out according to ASTM D-1003.

Blocking

On two superimposed sheets of film, a load of 50 g/cm$^2$ was applied, and, in this state, the film was left for 24 hours in a room at 40° C. and a relative humidity of 10 percent. Test pieces each measuring 20 mm × 110 mm were cut from this film. Each test piece was tested for maximum stress (g/10 cm$^2$) required for peeling by shear of the heat bonded surfaces of the film by means of a Schopper type tensile testing machine manufactured by Tōyō Seiki, Japan, at a pulling speed of 500 mm/min.

COMPARATIVE APPLICATION EXAMPLES 1 THROUGH 4

Films were prepared by the procedure of Application Example 1 except for the use, as propylene copolymers, of propylene/ethylene/hexene-1 ternary copolymers as indicated in Table 1 which do not contain a propylene homopolymer block. The properties of these films are shown in Table 1.

COMPARISON APPLICATION EXAMPLES 5 THROUGH 10

Films were prepared by the procedure of Application Example 1 except for the use, as propylene copolymers, the various propylene copolymers indicated in Table 1. The properties of these films are shown in Table 1.

APPLICATION EXAMPLES 1' THROUGH 4'

COMPARISON APPLICATION EXAMPLES 1' THROUGH 10'

A polypropylene, "Mitsubishi Noblene FL6" (trade name, intrinsic viscosity 2.3 dl/g in decalin at 135° C.) manufactured by Mitsubishi Petrochemical Co., Ltd. was used for the substrate layer. Compositions prepared by blending the various auxiliaries of Application Example 1 with the copolymers obtained according to Examples 1 through 4 in a series of runs and the propylene copolymers used in the Comparison Application Examples 1 through 10 in another series of runs were used for both the surface layers.

These materials for respective layers were fed from respectively separate extruders to a three-layer coextrusion die and extruded at a die temperature of 240° C. into a three-layer film.

This film was then cooled to bring its surface temperature to approximately 40° C. and was thereafter stretched 5 times at approximately 115° C. in a first (longitudinal) direction by means of a heating roll. This film was further introduced into an oven set at a temperature of approximately 160° to 165° C., stretched 9 times in the transverse direction by means of a tenter, and thermoset in an oven at approximately 158° C. Thereafter, the edges were cut off, and packaging film of an outer surface layer of 1-μ thickness and a substrate layer of 30-μ thickness was obtained.

The properties of these 14 kinds of packaging films are shown in Table 2. The heat sealing temperatures in Table 2 are heating-plate temperatures for obtaining test pieces necessary for obtaining a strength of 100 g/2 cm of width.

TABLE 1

| | Propylene copolymer | | | | | | | Film properties | | |
|---|---|---|---|---|---|---|---|---|---|---|
| | Propylene homopoly-mer block content | Random copolymer block | | | | | Intrinsic viscosity | Heat seal temp. | Haze | Blocking |
| | | Copolymer block content | Olefin composition (% by wt.) | | | | | | | |
| Test No. | (% by wt.) | (% by wt.) | propylene | ethylene | butene-1 | hexene-1 | (dl/g) | (°C.) | (%) | (g/10 cm$^2$) |
| Application Example | | | | | | | | | | |
| 1 | 17.2 | 82.8 | 88.4 | 3.6 | 0 | 8.0 | 2.4 | 85 | 8.8 | 340 |
| 2 | 5.6 | 94.4 | 87.3 | 2.2 | 0 | 10.5 | 2.9 | 95 | 9.4 | 320 |
| 3 | 12.5 | 87.5 | 93.7 | 3.8 | 0 | 2.5 | 2.6 | 87 | 8.7 | 370 |
| 4 | 4.2 | 95.8 | 91.6 | 2.4 | 0 | 6.0 | 2.5 | 92 | 9.5 | 360 |
| Comparative Application Example | | | | | | | | | | |

TABLE 1-continued

| | Propylene copolymer | | | | | | | Film properties | | |
|---|---|---|---|---|---|---|---|---|---|---|
| | Propylene homopolymer block content | Random copolymer block | | | | | Intrinsic viscosity | Heat seal temp. | Haze | Blocking |
| | | Copolymer block content | Olefin composition (% by wt.) | | | | | | | |
| Test No. | (% by wt.) | (% by wt.) | propylene | ethylene | butene-1 | hexene-1 | (dl/g) | (°C.) | (%) | (g/10 cm²) |
| 1 | 0 | 100 | 88.4 | 3.5 | 0 | 8.1 | 2.4 | 83 | 8.6 | 490 |
| 2 | 0 | 100 | 87.1 | 2.2 | 0 | 10.7 | 2.7 | 87 | 9.2 | 480 |
| 3 | 0 | 100 | 93.9 | 3.7 | 0 | 2.4 | 2.5 | 81 | 8.2 | 570 |
| 4 | 0 | 100 | 91.6 | 2.5 | 0 | 5.9 | 2.4 | 90 | 9.2 | 530 |
| 5 | 7.5 | 92.5 | 83.3 | 5.5 | 0 | 11.2 | 2.9 | 86 | 8.1 | 910 |
| 6 | 6.8 | 93.2 | 81.4 | 1.0 | 0 | 17.6 | 3.1 | 92 | 8.8 | 620 |
| 7 | 11.8 | 88.2 | 91.9 | 0 | 0 | 8.1 | 1.8 | 144 | 11.4 | 500 |
| 8 | 3.8 | 96.2 | 96.5 | 3.5 | 0 | 0 | 2.4 | 148 | 13.3 | 380 |
| 9 | 10.8 | 89.2 | 91.5 | 2.3 | 6.2 | 0 | 2.3 | 132 | 12.5 | 360 |
| 10 | 0 | 100 | 91.4 | 2.4 | 6.2 | 0 | 2.5 | 126 | 12.0 | 440 |

TABLE 2

| | Propylene copolymer | | | | | | | Film properties | |
|---|---|---|---|---|---|---|---|---|---|
| | Propylene homopolymer block content | Random copolymer block | | | | | Intrinsic viscosity | Heat seal temp. | Blocking |
| | | Copolymer block content | Olefin composition (% by wt.) | | | | | | |
| Test No. | (% by wt.) | (% by wt.) | propylene | ethylene | butene-1 | hexene-1 | (dl/g) | (°C.) | (g/10 cm²) |
| Application Example | | | | | | | | | |
| 1' | 17.2 | 82.8 | 88.4 | 3.6 | 0 | 8.0 | 2.4 | 73 | 200 |
| 2' | 5.6 | 94.4 | 87.3 | 2.2 | 0 | 10.5 | 2.9 | 84 | 190 |
| 3' | 12.5 | 87.5 | 93.7 | 3.8 | 0 | 2.5 | 2.6 | 71 | 220 |
| 4' | 4.2 | 95.8 | 91.6 | 2.4 | 0 | 6.0 | 2.5 | 84 | 210 |
| Comparative Application Example | | | | | | | | | |
| 1' | 0 | 100 | 88.4 | 3.5 | 0 | 8.1 | 2.4 | 70 | 300 |
| 2' | 0 | 100 | 87.1 | 2.2 | 0 | 10.7 | 2.7 | 78 | 290 |
| 3' | 0 | 100 | 93.9 | 3.7 | 0 | 2.4 | 2.5 | 66 | 340 |
| 4' | 0 | 100 | 91.6 | 2.5 | 0 | 5.9 | 2.4 | 75 | 320 |
| 5' | 7.5 | 92.5 | 83.3 | 5.5 | 0 | 11.2 | 2.9 | 64 | 630 |
| 6' | 6.8 | 93.2 | 81.4 | 1.0 | 0 | 17.6 | 3.1 | 76 | 370 |
| 7' | 11.8 | 88.2 | 91.9 | 0 | 0 | 8.1 | 1.8 | 116 | 320 |
| 8' | 3.8 | 96.2 | 96.5 | 3.5 | 0 | 0 | 2.4 | 129 | 190 |
| 9' | 10.8 | 89.2 | 91.5 | 2.3 | 6.2 | 0 | 2.3 | 105 | 170 |
| 10' | 0 | 100 | 91.4 | 2.4 | 6.2 | 0 | 2.5 | 99 | 200 |

What we claim is:

1. A propylene copolymer which comprises a block comprising a homopolymer of propylene and a block comprising a ternary random copolymer of propylene, ethylene, and hexene-1, and in which:
   (a) the proportion of the propylene homopolymer block in the propylene copolymer is 3 to 20 percent by weight;
   (b) the proportion of the ternary random copolymer block in the propylene copolymer is 97 to 80 percent by weight;
   (c) the ternary random copolymer block comprises the portions based on the propylene, ethylene, and hexene-1 of 80 to 98 percent, 5 to 1 percent, and 15 to 1 percent, respectively, all percentages being by weight; and
   (d) the intrinsic viscosity of the propylene copolymer in decalin at 135° C. is 0.3 to 15 dl/g.

2. A propylene copolymer according to claim 1 in which:
   (i) the proportion of the propylene homopolymer block in the propylene copolymer is 3 to 15 percent by weight; and
   (ii) the ternary random copolymer block comprises portions based on the propylene, ethylene, and hexene-1 of 85 to 96 percent, 4 to 2 percent, and 11 to 2 percent, respectively, all percentages being by weight.

3. A propylene copolymer according to claim 1 in which the ethylene content and the hexene-1 content in the ternary random copolymer block are within a region enclosed by the group of straight lines expressed by the relationships $2 \leq X \leq 11$, $2 \leq Y \leq 4$, and $(-\frac{1}{4}X+3.5) \leq Y \leq (-\frac{1}{4}X+6)$ in an XY coordinate plane wherein the X axis represents the hexene-1 content in percent by weight, and the Y axis represents the ethylene content in percent by weight.

4. A propylene copolymer according to any one of claims 1 to 3 which has been produced by using, as a catalyst, a mixture of (1) a solid obtained by reducing TiCl$_4$ with an organoaluminum compound or metal aluminum and further treating the product with a complexing agent and (2) an organoaluminum compound.

5. A propylene copolymer according to claim 4 in which the complexing agent is a monoether containing a total quantity of carbon atoms of 8 to 12.

* * * * *